(12) United States Patent
Jang et al.

(10) Patent No.: US 8,416,809 B2
(45) Date of Patent: *Apr. 9, 2013

(54) APPARATUS FOR REPORTING RECEPTION RESULT OF PACKETS IN MOBILE COMMUNICATION SYSTEM

(75) Inventors: Kyung-Hun Jang, Suwon-si (KR); Jong-Ae Park, Yongin-si (KR); Dong-jun Lee, Seoul (KR); Jin-Bong Chang, Daejeon (KR); Yoong-Soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 632 days.

This patent is subject to a terminal disclaimer.

(21) Appl. No.: 12/561,082

(22) Filed: Sep. 16, 2009

(65) Prior Publication Data

US 2010/0008381 A1 Jan. 14, 2010

Related U.S. Application Data

(63) Continuation of application No. 11/202,895, filed on Aug. 12, 2005, now Pat. No. 7,599,363.

(30) Foreign Application Priority Data

Aug. 13, 2004 (KR) .......................... 10-2004-064049
May 26, 2005 (KR) .......................... 10-2005-044645

(51) Int. Cl.
*H04J 3/00* (2006.01)
*H04L 12/28* (2006.01)
(52) U.S. Cl. ....................................... 370/476; 370/389
(58) Field of Classification Search .................. 370/476, 370/398

See application file for complete search history.

(56) References Cited

U.S. PATENT DOCUMENTS 5,396,490 A 3/1995 White et al.
5,517,511 A 5/1996 Hardwick et al.
(Continued)

FOREIGN PATENT DOCUMENTS

EP 1 626 520 A1 2/2006
JP 2004-072288 A 3/2004
(Continued)

OTHER PUBLICATIONS (Technical Paper) Sanjiv Nanda, et al., "MAC Enhancements for 802.11n," IEEE802.11-07-0717r0, Jul. 2004, 2 pages, URL, http://www.ieee802.org/11/DocFiles/04/11-04-0717-00-000n-mac-overview.ppt.

(Technical Paper) John Ketchum, et al., "System Description and Operating Principles for High Thoughput Enhancements to 802.11," IEEE802.11-04/0870r0, Aug. 2004, 4 pages including p. 31, 32, 48, URL, http://www.ieee802.org/11/DocFiles/04/11-04-0870-00-000n-802-11-ht-system-description-and-operating-principles.doc.

(Continued)

*Primary Examiner* — Mark Rinehart
*Assistant Examiner* — Angel Brockman
(74) *Attorney, Agent, or Firm* — NSIP Law

(57) ABSTRACT

Disclosed is a receiver for configuring a Block Acknowledgement (BA) frame in a wireless communication system for acknowledgement of a data transmission from a transmitter. The receiver receives a Block Acknowledgement Request (BAR) frame in the data transmission from the transmitter and determines an overall size of a bitmap for the BA frame from the BAR frame to acknowledge the data transmission. The receiver configures the BA frame of the response to include the bitmap having the determined overall size, and transmits the configured BA frame to the transmitter. The bitmap of the BA frame includes bits representing reception results of packets of the data transmission received from the transmitter.

10 Claims, 14 Drawing Sheets

U.S. PATENT DOCUMENTS

| | | | |
|---|---|---|---|
| 6,301,249 | B1 | 10/2001 | Mansfield et al. |
| 6,658,619 | B1 * | 12/2003 | Chen .................. 714/748 |
| 6,763,491 | B2 * | 7/2004 | McDonnell .............. 714/750 |
| 6,772,215 | B1 | 8/2004 | Rathonyi et al. |
| 6,778,501 | B1 | 8/2004 | Malmgren et al. |
| 7,385,976 | B2 | 6/2008 | Gu et al. |
| 7,420,921 | B2 | 9/2008 | Fischer |
| 2003/0135640 | A1 | 7/2003 | Ho et al. |
| 2003/0214930 | A1 | 11/2003 | Fischer |
| 2006/0034274 | A1 * | 2/2006 | Kakani et al. ............ 370/389 |

FOREIGN PATENT DOCUMENTS

| | | |
|---|---|---|
| KR | 10-0159795 B1 | 8/1998 |
| KR | 10-2001-0074801 | 8/2001 |
| KR | 10-2002-0003232 | 1/2002 |
| KR | 10-2002-0041851 | 6/2002 |
| KR | 10-2004-0073884 | 8/2004 |
| WO | WO 00/60797 | 10/2000 |
| WO | WO 00/60797 A2 | 10/2000 |
| WO | WO 02/32039 A2 | 4/2002 |
| WO | WO 03/061208 A1 | 7/2003 |

OTHER PUBLICATIONS

International Search Report issued in counterpart International Application No. 05017623.9 on Feb. 2, 2012 (8 pages).

Search Report dated Apr. 5, 2012, in counterpart European Application No. 05017623.9 (in English, 15 pages).

Balachandran, Krishna, et al. "Efficient Transmission of ARQ Feedback for EGPRS Radio Link Control," Vehicular Technology Conference, 1999. VTC 1999- Fall. IEEE VTS 50$^{th}$ Amsterdam, Netherlands Sep. 19-22, 1999, Piscataway, NJ, USA, IEEE, US, vol. 3, Sep. 19, 1999, pp. 1663-1669, XP010353299.

Jang, Kyunghun, et al. "SAMSUNG MAC Proposal Technical Specification," IEEE, Piscataway, NJ, USA, Aug. 13, 2004, pp. 1-36, XP040384651.

Jang, Kyunghun, et al. "SAMSUNG 11n MAC," Aug. 3, 2004, pp. 1-28, XP002667743.

* cited by examiner

US 8,416,809 B2

APPARATUS FOR REPORTING RECEPTION RESULT OF PACKETS IN MOBILE COMMUNICATION SYSTEM

PRIORITIES

This application claims the benefit under 35 U.S.C. §120 of and is a continuation of co-pending U.S. patent application Ser. No. 11/202,895 titled "Method for Reporting Reception Results of Packets in Mobile Communication System" filed in the United States Patent and Trademark Office on Aug. 12, 2005, which claims the benefit under 35 U.S.C. §119(e) of U.S. Provisional Application Ser. No. 60/607,610 titled "Method for Reporting Reception Results of Packets in Mobile Communication System" filed in United States Patent and Trademark Office on Sep. 7, 2004 and the benefit under 35 U.S.C. §119(e) of Korean Applications Nos. 2004-64049 and 2005-44645 filed in the Korean Industrial Property Office on Aug. 13, 2004 and May 26, 2005, respectively, which the contents of each of which were incorporated therein by reference. U.S. patent application Ser. No. 11/202,895 is expressly incorporated herein by reference in its entirety for all purposes.

BACKGROUND

1. Field of the Invention

The present invention relates to a bitmap structure for reporting reception result of packets applying a retransmission technique and a method for transmitting/receiving the reception result in a mobile communication system.

In general, a radio channel can cause errors in transmitted packets under the influence of multi-path fading, interferences among users, noises, and so forth. A solution to this problem includes a Forward Error Correction Code (FEC) scheme in which the probability of error occurrence is lowered by additionally sending redundant information, an Automatic Repeat Request (ARQ) scheme in which, when errors occurs, retransmission of packets where the errors have occurred is requested, and a Hybrid Automatic Retransmission Request (HARQ) scheme which combines both the schemes.

In the ARQ scheme, a receiver uses an Acknowledgment (ACK)/Not Acknowledgment (NACK) signal for notifying a transmitter of whether or not received packets are erroneous. The ACK signal confirms to the transmitter that the receiver has received the corresponding packets. In contrast, the NACK signal confirms to the transmitter that the receiver has failed to receive the corresponding packets. If the transmitter receives the NACK signal, the transmitter retransmits the corresponding packets to the receiver.

In addition to the general ARQ scheme in which reception results are acknowledged on a packet-by-packet basis, there is a block ARQ scheme in which reception results of a plurality of transmitted packets are acknowledged as a group through a block ARQ message.

FIG. 1 is a diagram illustrating a basic concept of a general block ARQ scheme based on an example which presumes that the block ARQ scheme is applied to every three packets.

Referring to FIG. 1, a transmitter transmits three packets, that is, Packet #1, Packet #2 and Packet #3, in sequence. The three packets (Packet #1 to Packet #3) have the same Destination Address (DA), for example, DA2. Each of the packets (Packet #1 to Packet #3) is provided with a Sequence Number (SN) and a Fragmentation Number (FN). The SN signifies the order in which packets are transmitted from an upper layer. Even packets having the same SN may be transmitted over a plurality of packets as occasion demands. The FN signifies the order of transmitting the plurality of packets divided over the transmission from packet having the one same SN.

A receiver checks whether or not packets are continuously received and which packets are not received by comparing the SN and the FN of a received packet with those of previously received packets. In the following description, packets at an SN level will be referred to as 'SN level packets', and packets divided from the SN level packets will be referred to as 'fragmentation packets'. When a packet is not referred to as the SN level packet or the fragmentation packet, but simply referred to as 'a packet', it is meant to incorporate both of the above-mentioned two types of packets.

Of the three packets, the first and second packets (Packet #1, Packet #2) are fragmentation packets having the same SN (e.g., SN 1) and different FNs (e.g., Frag 1, Frag 2). The third packet (packet #3) is an SN level packet having a different SN (e.g., SN 2) from that of the first and second packets (Packet #1, Packet #2).

In FIG. 1, it is assumed that the receiver succeeds in receiving the first and third packets (Packet #1, Packet #3) and fails to receive the second packet (Packet #2).

The receiver configures a block ACK message on the basis of the reception result as stated above and transmits the configured block ACK message to the transmitter. The block ACK message includes a header and a payload. A Destination Address DA1 is recorded in the header. The Destination Address DA1 is an address of the transmitter. The reception results for the respective received packets are recorded in the payload.

Applying the above-mentioned assumption, the ACK information is recorded as the reception result corresponding to the first and third packets (Packet #1, Packet #3), and NACK information is recorded as the reception result corresponding to the second packet (Packet #2). SNs and FNs of the corresponding packets are recorded together in the reception results.

The transmitter receives the block ACK message. The transmitter confirms through the block ACK message that the receiver succeeds in receiving the first and third packets (Packet #1, Packet #3) and failed to receive the second packet (Packet #2). Thereafter, although not shown in FIG. 1, the transmitter retransmits the second packet (Packet #2).

The above-mentioned scheme in which the reception results for all the received packets are recorded in one block ACK message can be realized in various ways. However, in order to use a message having the shortest length, a bitmap scheme is employed.

FIGS. 2 to 4 show examples of using the bitmap scheme for acknowledging reception results.

Referring to FIG. 2, the block ACK message includes a block ACK starting sequence field and a bitmap field. The bitmap field consists of N ACK report fields. 'N' is a value corresponding the maximum SN and signifies the maximum number of sequences capable of being acknowledged. That is, 'N' may be defined as the maximum allowable number of SN level packets which can be processed by one block ACK message.

The first SN level packet, with which a bitmap in a corresponding message deals, is recorded in the block ACK starting sequence field. Each of reception results for N consecutive packets starting from the packet having the SN recorded in the block ACK starting sequence field is recorded in the bitmap Field.

The respective ACK report fields constituting the bitmap field are divided into (M×8) regions b0, b1, b2, . . . , b(n), . . . , b(8×M−1) corresponding to the number of fragmentation packets which can be divided to the maximum extent from one SN level packet. Hereinafter, such regions b0, b1, b2, . . . , b(n), . . . , b(8×M−1) will be referred to as 'reception result information fields'. This is because reception results are acknowledged on a packet-by-packet basis. Thus, if the reception result is expressed by one bit, M octets are required for the total reception results information fields for one SN level packet, and so the bitmap field has an overall length of M×N octets.

For example, when SN=1 is recorded in the block ACK starting sequence field, the reception result for a fragmentation packet having SN=1 and FN=n−1 will be recorded in the reception result information field b(n) 210. If the receiver succeeds in receiving this fragmentation packet, '1' is recorded in the reception result information field b(n) 210. Otherwise, if the receiver fails in receiving the fragmentation packet, '0' is recorded in the reception result information field b(n) 210. This is based on the assumption that '1' is an indicator bit representing reception success and '0' is an indicator bit representing reception failure. As another example, when '5' is recorded in the block ACK starting sequence field, '1' is set to a third bit of the second octet if a fragmentation packet having SN=6 and FN=3.

FIG. 3 shows the above-mentioned general example when applied to a system based on the IEEE 802.16 standard (the 802.16), and FIG. 2 shows the same example when applied to a system based on the IEEE 802.11e standard (the 802.11e).

A block ACK message shown in FIG. 3 includes a connection ID field, an ACK control field and a plurality of ACK MAP fields. The ACK control field includes a field in which a starting SN is recorded, and a field in which the number of ACK MAPs (m) is recorded. The ACK MAP fields are equal in number to the number of ACK MAPs (m). The ACK MAP field has the same structure as that of the ACK report field in FIG. 2. In FIG. 3, each of the connection ID field, the ACK control field and the plurality of ACK MAP fields are configured as a 2-octet field. Thus, the block ACK message has an overall length of '(m+2)×2'. Usually, 'm' is a variable value and the maximum number of fragmentation packets is 16 in the 802.16.

A block ACK message shown in FIG. 4 includes a BA starting sequence control field and a BA bitmap field. Information indicating a starting sequence recorded in the bitmap field is recorded in the BA starting sequence control field. The BA bitmap field consists of a plurality of ACK MAP fields. Each ACK MAP field has the same structure as that of the ACK report field in FIG. 2. For example, in the 802.11e, it is possible to simultaneously perform ACK processing for a maximum of 64 SN level packets, and one SN level packet can be divided into 16 fragmentation packets. Thus, when each ACK MAP field is configured as a 2-octet field, the BA bitmap field must maintain a size of 128 octets.

SUMMARY

As stated above, if reception results are acknowledged using the conventional bitmap scheme, a wasting of resources occurs. That is, in conventional bitmap scheme, the bitmap is configured by taking into consideration that the respective SN level packets will be divided into maximum fragmentation packets. Thus, when a reception result corresponding to an SN level packet, which is not divided into fragmentation packets or is not divided into a maximum number of fragmentation packets, is transmitted, reception result information fields not used in the bitmap field occur. Such reception result information fields may be said to be unnecessary resources.

Accordingly, the present invention has been made to solve at least the above-mentioned problems occurring in the prior art, and an object of the present invention is to provide a method for minimizing the length of a message to be transmitted.

It is a further object of the present invention to provide a method for assigning indicator bit regions to a reception result transmitting message, which enables an unsuccessfully received packet to be quickly confirmed.

It is a further object of the present invention to provide a method for transmitting only reception result information for unsuccessfully received packets.

It is a further object of the present invention to provide a method for confirming unsuccessfully received packets through indicator bits corresponding to the respective packets and transmitting only reception result information for the unsuccessfully received packets.

It is a further object of the present invention to provide a method for determining the size of a bitmap field, in which reception result information is recorded, in a message transmitting the reception result information based on the number of unsuccessfully received packets.

It is a further object of the present invention to provide a method for expanding message regions for transmitting reception result information when the number of unsuccessfully received packets exceeds a threshold value.

It is a further object of the present invention to provide a method for optimizing the size of a bitmap by prior negotiation.

It is a further object of the present invention to provide a frame structure for optimizing the size of a bitmap by prior negotiation.

It is a further object of the present invention to provide a method for transmitting the number of SN level packets and the number of fragmentation packets from a transmitting party to a receiving party in order to optimize the size of a bitmap.

It is a further object of the present invention to provide a method for optimizing the size of a bitmap by the number of SN level packets and the number of fragmentation packets.

It is a further object of the present invention to provide a frame structure for optimizing the size of a bitmap by the number of SN level packets and the number of fragmentation packets.

In order to accomplish these objects, in accordance with a first aspect of the present invention, there is provided a method for configuring a reception result reporting message for reporting to a transmitter reception results for received packets in a receiver of a mobile communication system in which a plurality of packets to be consecutively transmitted are transmitted as a plurality of fragmentation packets, the method includes recording indicators, each of which indicates reception success or failure for each of the received packets, in a first bitmap field of the reception result reporting message; and creating a second bitmap field, in which reception results corresponding to the unsuccessfully received packets of the received packets will be recorded, in the reception result reporting message, and recording indicator bits, each of which indicates reception success or failure for each of the fragmentation packets of the unsuccessfully received packets, in the second bitmap field.

In order to accomplish the above-mentioned objects, in accordance with a second aspect of the present invention, there is provided a method for retransmitting packets in response to a reception result reporting message from a receiver in a transmitter of a mobile communication system in which a plurality of packets to be consecutively transmitted are transmitted as a plurality of fragmentation packets, the method includes checking if unsuccessfully received packets exist through indicators of the respective plural packets, which are recorded in a first bitmap field of the reception result reporting message; identifying unsuccessfully received fragmentation packets corresponding to the unsuccessfully received packets through indicator bits which exist in a second bitmap field of the reception result reporting message; and retransmitting the unsuccessfully received fragmentation packets or the packets including the unsuccessfully received fragmentation packets.

In order to accomplish the above-mentioned objects, in accordance with a third aspect of the present invention, there is provided a method for configuring bitmaps in a mobile communication system, the method includes receiving information about the number of consecutively received packets and the maximum number of fragmentation packets; and determining a bitmap configuration scheme by the information about the number of consecutively received packets and the maximum number of fragmentation packets.

In order to accomplish the above-mentioned objects, in accordance with a fourth aspect of the present invention, there is provided a method for requesting reception results for transmitted packets in a mobile communication system, the method includes consecutively transmitting a predetermined number of packets (m) while the respective packets are divided into one or more fragmentation packets; and transmitting information about the number of consecutively transmitted packets (m) and the number of fragmentation packets (n).

In order to accomplish the above-mentioned objects, in accordance with a fifth aspect of the present invention, there is provided a method for reporting reception results for received packets in a mobile communication system, the method includes consecutively receiving m packets divided into one or more fragmentation packets; receiving information about the number of consecutively received packets (m) and the number of fragmentation packets (n); determining a bitmap configuration scheme by the information about the number of consecutively received packets (m) and the number of fragmentation packets (n); configuring the bitmaps including reception results for the respective fragmentation packets by the determined bitmap configuration scheme; and transmitting the bitmaps.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
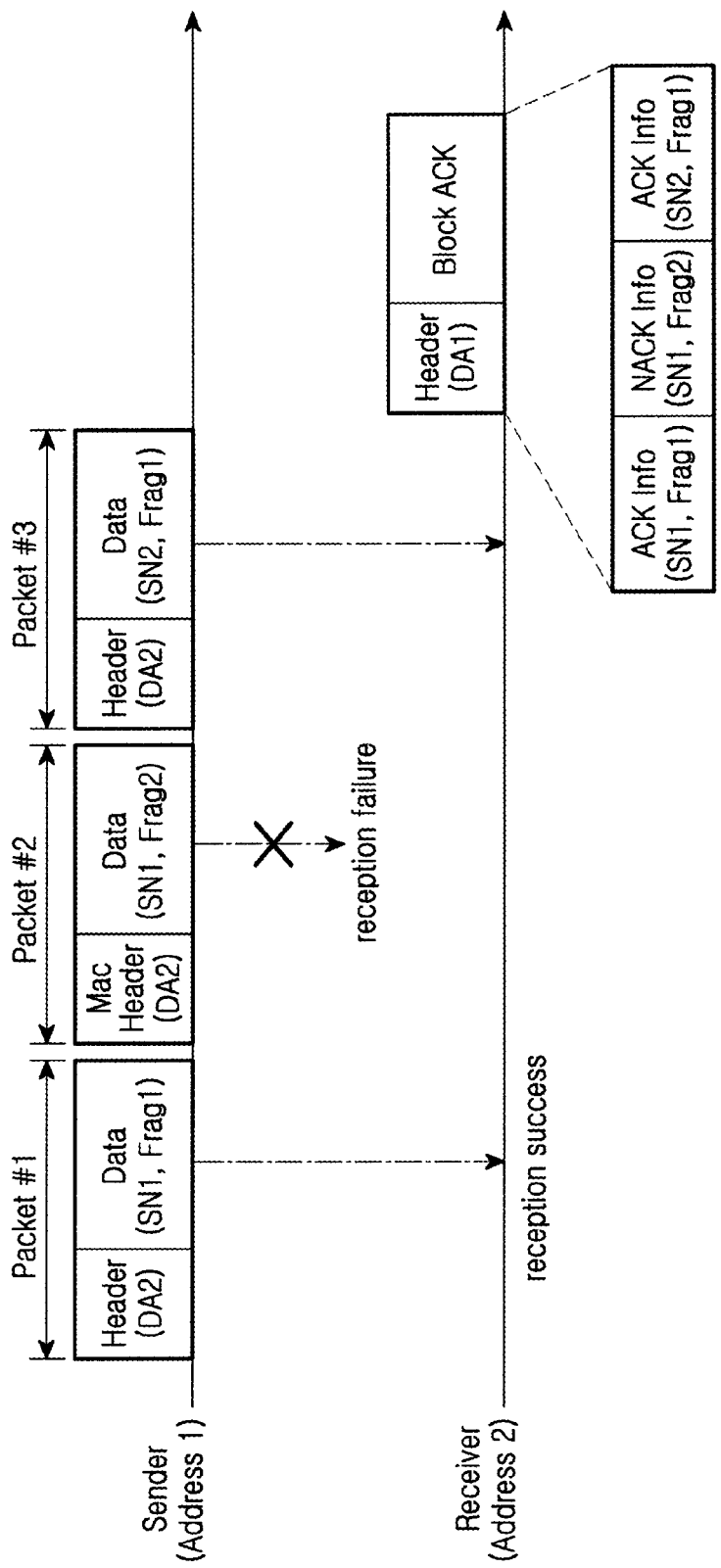
FIG. 1 is a diagram illustrating a basic concept of a general block ARQ scheme.
Figure 2:
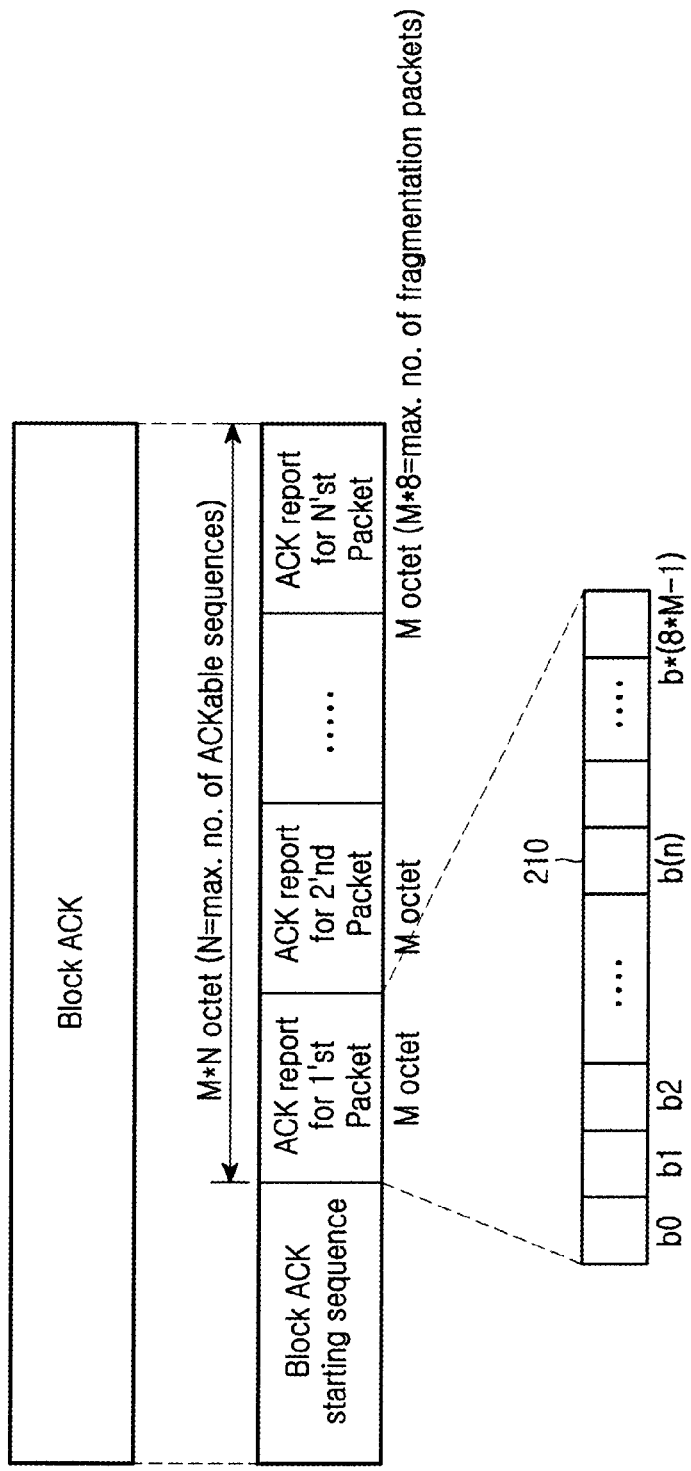
FIGS. 2 to 4 are diagrams showing examples of acknowledging reception results using various conventional bitmap schemes.
Figure 3:
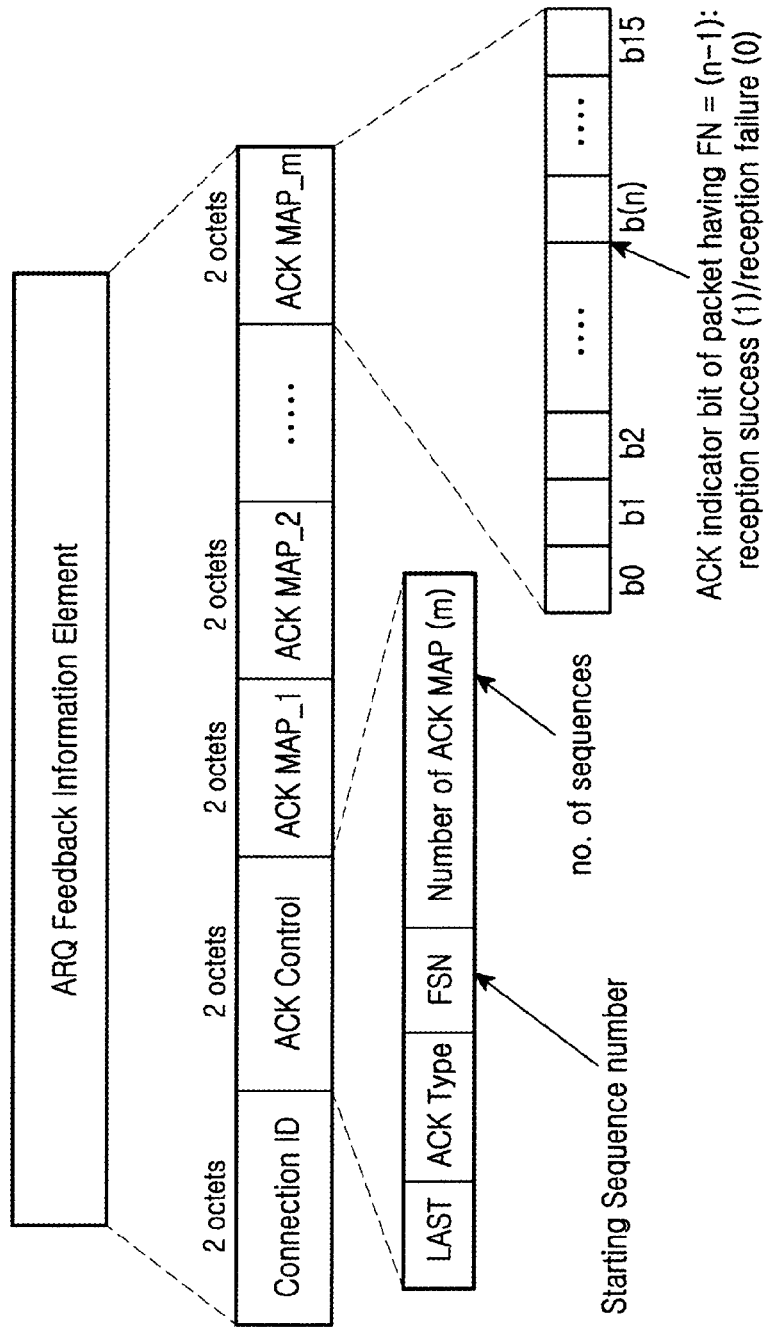
Figure 4:
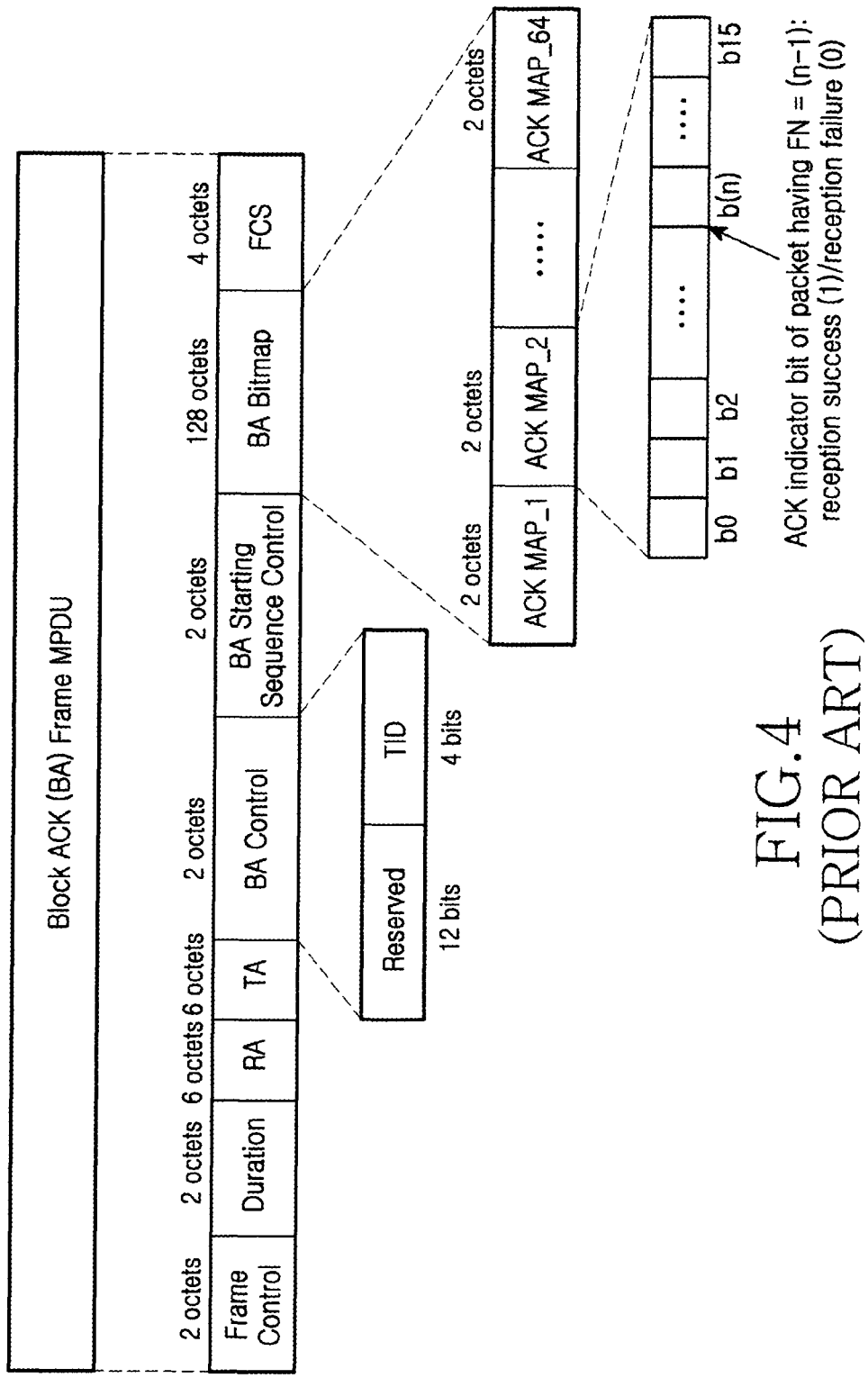

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

The present invention proposes a message which has a structure enabling the size of a field (bitmap field) containing information according to reception results to be optimized while fully performing its intrinsic function of acknowledging the reception results. Also, the present invention proposes a message which has a structure significantly reducing the size of the bitmap. In the following description, a bitmap configuring method in which the size of the bitmap is reduced by reporting only reception results for unsuccessfully received packets will be proposed as a first preferred embodiment. In addition, a bitmap configuring method in which the size of the bitmap is optimized by reporting reception results based on information provided by a transmitting party will be proposed as a second preferred embodiment.

Hereinafter, the first preferred embodiment of the present invention will be describe in detail with reference to the accompanying drawings The first embodiment of the present invention may be realized based on two considerations.

First, a Packet Error Rate (PER) in a general wireless data communication system is designed at a lower level. Second, packet losses are concentrated at a specific moment rather than uniformly distributed.

In view of the two considerations, the number of erroneous packets may be very small and errors may concentrically occur at a specific moment, if any. Thus, it may be expected to succeed in receiving most packets and fail in receiving only some packets even if reception failures occur.

If an ARQ scheme is realized such that only reception results for unsuccessfully received packets are acknowledged, the amount of information according to the acknowledgment of the reception results can be greatly reduced. The reduction in the amount of information according to the acknowledgment of the reception results means that the size of the bitmap is reduced.

In the following detailed description, there is proposed a block ACK message for reporting only reception results corresponding to unsuccessfully received fragmentation packets of fragmentation packets transmitted from an SN level packet. To this end, a field (herein after referred to as 'SN level bitmap field') for transmitting indicators which enables success or failure in receiving each of the maximum allowable SN level packets treatable by the block ACK to be confirmed is newly defined. Also, a field (hereinafter referred to as 'ACK report field') for transmitting concrete reception results corresponding to the unsuccessfully received SN level packet is newly defined. Here, the concrete reception results are indicators which enable success or failure in receiving each of the fragmentation packets transmitted from one SN level packet to be confirmed.

In order to configure such a block ACK message, a transmitting party (a party having received packets) checks on an SN-by-SN basis if unsuccessfully received packets exist. Subsequently, for the unsuccessfully received packets, a transmitting party sets 'reception failure' to indicators corresponding to the SNs of the unsuccessfully received packets in the SN level bitmap field. In contrast with this, for successfully received packets, a transmitting party sets 'reception success' to indicators corresponding to the SNs of the successfully received packets in the SN level bitmap field.

However, when a plurality of fragmentation packets having the same SN are received, it is not possible to confirm reception results for the fragmentation packets by only the SN level bitmap field. In this case, separate information enabling unsuccessfully received fragmentation packets to be confirmed is required.

In the first embodiment of the present invention, therefore, the ACK report fields are separately created according to the SNs of the unsuccessfully received packets. Indicators corresponding to the respective fragmentation packets are recorded, that is, indicators are recorded on an FN-by-FN basis in the ACK report fields. These indicators represents reception success or reception failure for the fragmentation packets having the same SN. The ACK report fields are configured by taking into consideration the maximum number of fragmentation packets from one SN level packet.

The transmitting party transmits the so-configured block ACK message to a receiving party.

The receiving party (a party having transmitted packets) confirms reception success or failure for the respective SN level packets by checking the indicators recorded in the SN level bitmap field of the block ACK message. When unsuccessfully received SN level packets exist, the receiving party checks the ACK report fields corresponding to the unsuccessfully received SN level packets. The receiving party is notified of the unsuccessfully received fragmentation packets through the indicators recorded in the ACK report fields.

Figure 5:
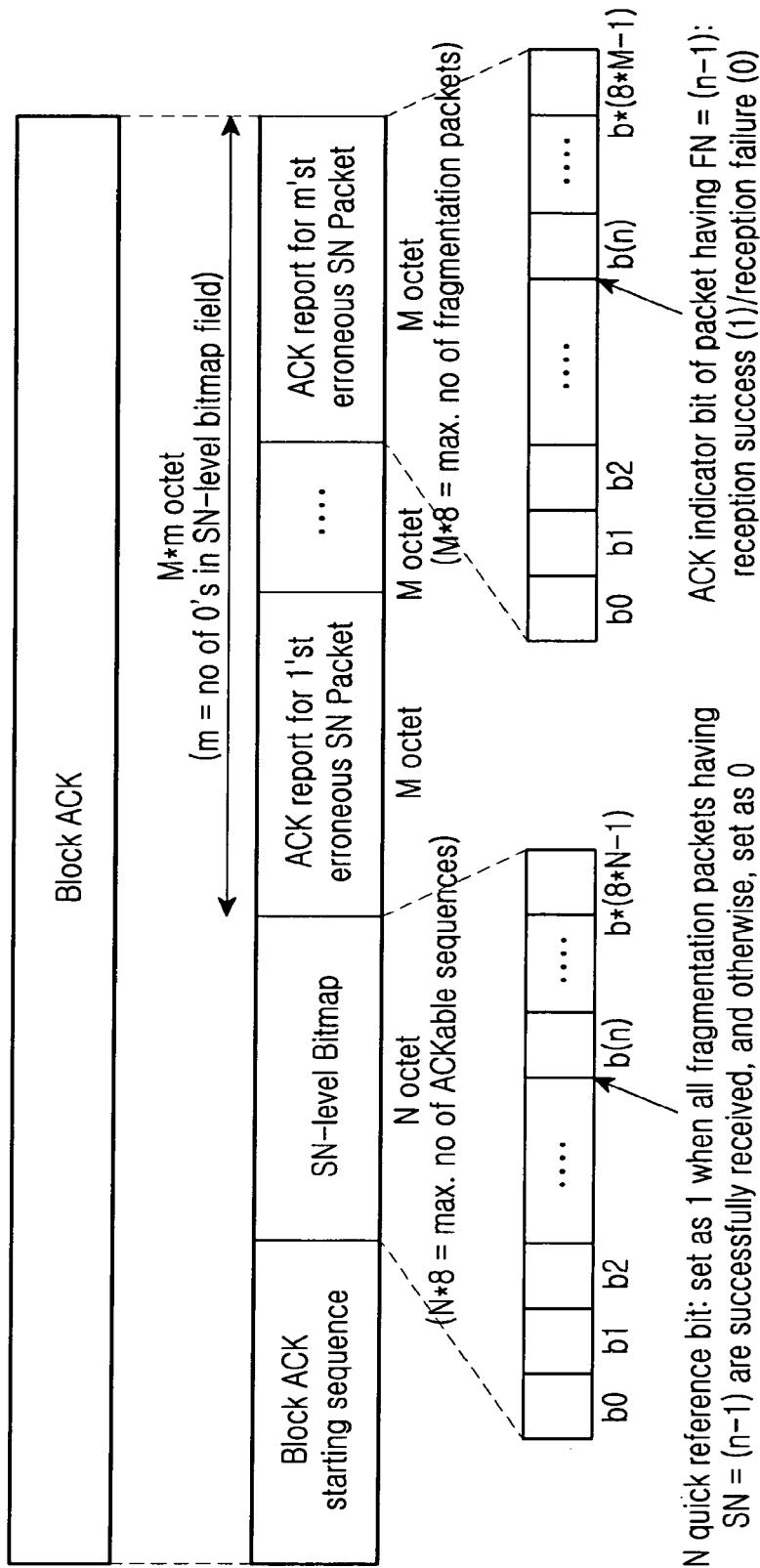
FIG. 5 is a diagram showing a hierarchical bitmap structure proposed according to the present invention.

FIG. 5 shows a hierarchical bitmap structure proposed according to the present invention.

Referring to FIG. 5, a block ACK message having the hierarchical bitmap structure includes a block ACK starting sequence field and a bitmap field. The bitmap field consist of an SN level bitmap field and an erroneous SN packet bitmap field. The erroneous SN packet bitmap field includes a plurality of ACK report fields (M×m ACK fields). Here, 'm' corresponds to the number of zeros ('0') set to the SN level bitmap field. 'M' is the number of unsuccessfully received SN level packets.

The SN of the first SN level packet with which bitmaps in a corresponding message deal is recorded in the block ACK starting sequence field. At this time, the first SN level packet may be defined as the first SN level packet to be acknowledged through the block ACK message. Here, it should be noted that the first SN level packet must not be interpreted as the first unsuccessfully received SN level packet.

Indicators (hereinafter referred to as 'SN quick reference bits') representing the reception results (reception success or failure) according to the respective SNs are recorded in the SN level bitmap field. The length of the SN level bitmap field is determined by the number of maximum allowable SN level packets that can be processed by the block ACK. That is, if the number of maximum allowable SN level packets that can be processed by the block ACK is 8×N, the SN level bitmap field has a length of N octets (8×N bits). Thus, each bit constituting the SN level bitmap field is used as the SN quick reference bit assigned SN by SN.

The erroneous SN packet bitmap field includes ACK report fields. Since the ACK report fields are separately created according to the SNs of the unsuccessfully received packets, the number of ACK report fields must be equal to the number of the unsuccessfully received SN level packets. Thus, the erroneous SN packet bitmap field has a length of M×m octets. Here, M octets, the overall length of the ACK report fields, is a fixed value, so the overall length of the erroneous SN packet bitmap field (M×m octets) is determined by the number of the unsuccessfully received SN level packets (m).

For example, the greater the number of the unsuccessfully received SN level packets (m), the longer the overall length of the erroneous SN packet bitmap field (M×m octets). In contrast with this, the lesser the number of unsuccessfully received SN level packets (m), the shorter the overall length of the erroneous SN packet bitmap field (M×m octets). If there are no unsuccessfully received SN level packets, the erroneous SN level packet bitmap field may not exist.

A mapping relation between the ACK report fields and the SN quick reference bits set as '0' can be established in various ways. In the simplest example, the ACK report fields are sequentially mapped corresponding to the SN order of the SN quick reference bits.

For example, if it is assumed that a value of the block ACK starting sequence field is 5 and a value of the SN level bitmap field is 11101011, two ACK report fields exist in the erroneous SN packet bitmap field. A first of the two ACK report fields becomes a bitmap of an SN level packet having SN=8, and a second becomes a bitmap of an SN level packet having SN=10. Also, a scheme in which indicators are assigned to the ACK report fields may be employed.

Indicators for reporting reception results for the respective fragmentation packet are recorded in the ACK report fields. Thus, the indicators exist corresponding to the maximum number of fragmentation packets that one SN level packet (M×8) can be divided into. This is because the reception results are acknowledged on a fragmentation packet-by-fragmentation packet basis. In FIG. 5, the indicators are designated by 'b0, b1, b2, . . . , b(n), . . . , b(8×M−1)'. For example, if the indicator is expressed by one bit, one ACK report field has a length of M octets.

Hereinafter, a description will be given for an example of actually configuring the block ACK message having the structure as shown in FIG. 5.

When all fragmentation packets divided from an SN level packet having SN=n+1 are successfully received, an (n+1)−th SN quick reference bit b(n) in the SN level bitmap field is set as '1'. However, when even one fragmentation packet is unsuccessfully received, the an (n+1)−th SN quick reference bit b(n) in the SN level bitmap field is set as '0'. That is, when even one fragmentation packet is unsuccessfully received, a quick reference bit corresponding to the SN of the unsuccessfully received fragmentation packet is set as "reception failure'. In this case, there must be provided separate information which enables the unsuccessfully received fragmentation packets to be confirmed.

If it is assumed that a fragmentation packet having SN=n+1 and FN n+1 is unsuccessfully received, an (n+1)−th SN quick reference bit, that is, b(n) in the SN level bitmap field, is set as '0', and an ACK report field (hereinafter referred to as 'm-th ACK report field') to be mapped to b(n) is assigned to the SN packet bitmap field. Subsequently, a bit representing reception failure is set to an (n+1)−th indicator b(n) in the m-th ACK report field. At this time, a bit representing reception success is set to the remaining indicators except the (n+1)-th indicator b(n) in the m-th ACK report field. As an example, '0' is used as the indicator representing reception failure and '1' is used as the indicator representing reception success.

Figure 6:
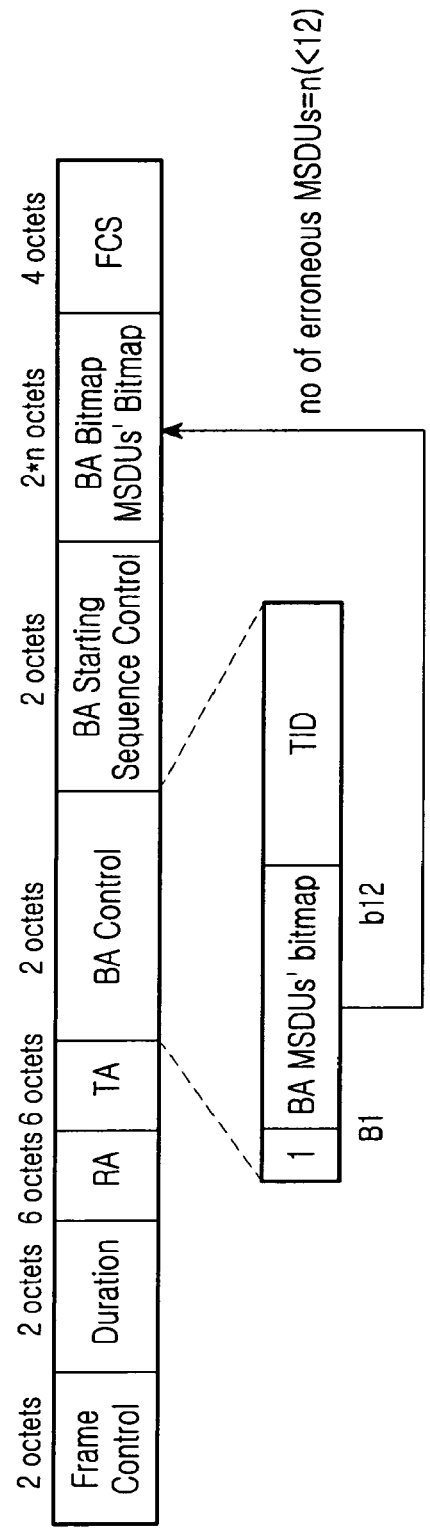
FIGS. 6 and 7 are diagrams showing examples of acknowledging reception results when the present invention is applied t to the 802.11n.
Figure 7:
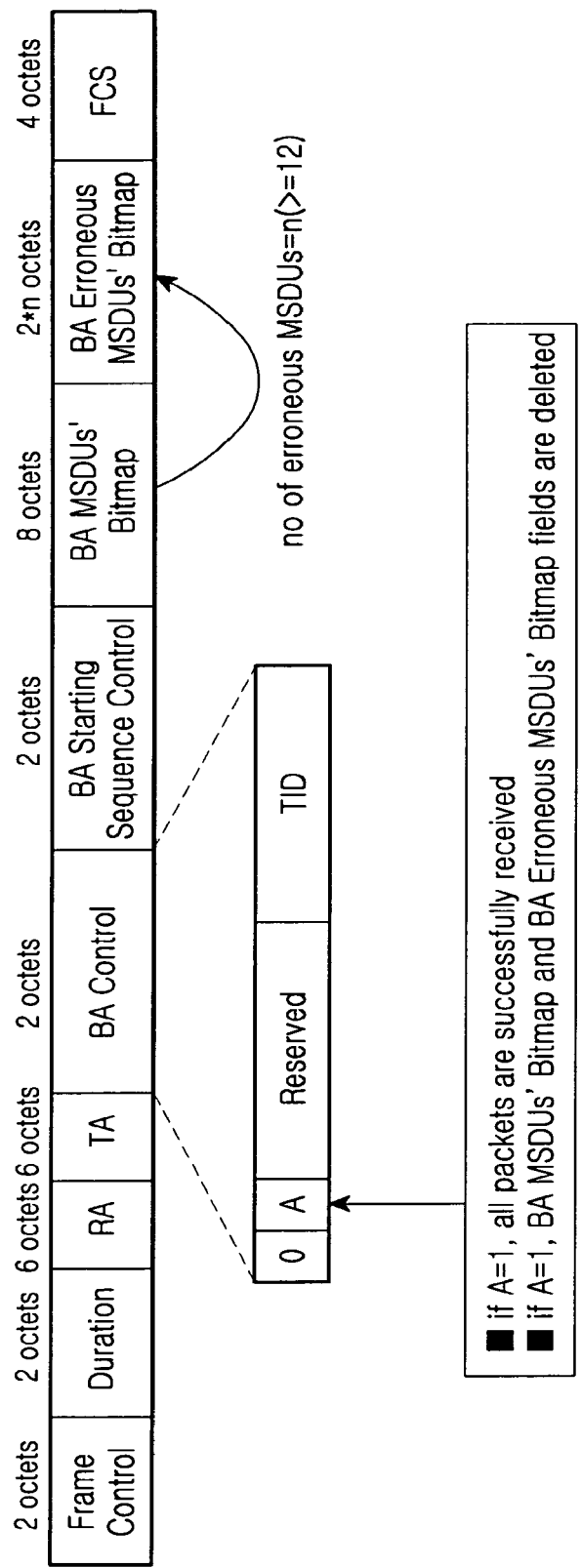

FIGS. 6 and 7 show examples of a message for reporting reception results when the present invention as described above is applied to a system based on the IEEE 802.11n standard (the 802.11n). The examples shown in FIGS. 6 and 7 are distinguished from each other by the number of unsuccessfully received packets. That is, if the number of unsuccessfully received MAC service data unit (MSDUs) does not reach a threshold value (e.g., 12), a message structure shown in FIG. 6 is employed. However, if the number of unsuccessfully received MSDUs is equal to or greater than the threshold value (e.g., 12), a message structure shown in FIG. 7 is employed.

Referring to FIG. 6, the block ACK message includes a BA control field, a BA starting sequence control field and a BA erroneous MSDUs' bitmap field.

The BA control field has a length of 2 octets. The BA control field includes a BA MSDUs' bitmap field and a TID field. The BA MSDUs' bitmap field consists of quick reference bits for representing reception success or failure for the respective SN level packets. The BA MSDUs' bitmap field is a region which has not been used in the existing 802.11 and is reused for the present invention. Since FIG. 6 supposes a case where the number of unsuccessfully received MSDUs is below 12, the BA MSDUs' bitmap field is configured with a size of 12 bits.

In addition, any one bit in the BA control field can be assigned for a message indicator. As an example, the first one bit of the BA control field may be assigned for the message indicator. The message indicator indicates a message type. In FIG. 6, '1' is used as the message indicator.

The SN of the first SN level packet with which bitmaps in a corresponding message deal is recorded in the BA starting sequence control field. The first SN level packet is a packet which is transmitted first from among consecutively transmitted packets for the block ACK, and it should be noted that the first SN level packet is not the first unsuccessfully received SN level packet.

The BS erroneous MSDUs' bitmap field consists of a plurality of ACK MAP fields not exceeding 11 in number. The BA erroneous MSDUs' bitmap field has the same structure and function as those of the erroneous SN packet bitmap field described above with reference to FIG. 5, thus, a detailed description of the BA erroneous MSDUs' bitmap field will be omitted.

Referring to FIG. 7, the block ACK message includes a BA control field, a BA starting sequence control field, a BA MSDUs' bitmap field and a BA erroneous MSDUs' bitmap field.

Any one bit in the BA control field is assigned for a message indicator. As an example, the first one bit of the BA control field may be assigned for the message indicator. In FIG. 7, '0' is used as the message indicator. In addition, another one bit in the BA control field is assigned for a success indicator. The success indicator indicates that all packets (64 MSDUs' are assumed in FIG. 7) are successfully received (designated by 'A' in the drawing). When all SN level packets are successfully received, the success indicator is set as '1'. However, when even one SN level packet is unsuccessfully received, the success indicator is set as '0'. If the success indicator is set as '1', the BS MSDUs' bitmap field and the BA erroneous packet bitmap field are not needed.

The BA MSDUs' bitmap field carries out the same function as that of the BA MSDUs' bitmap field existing in the BA control field as shown in FIG. 6, so a detailed description thereof will be omitted. The only difference between both the BA MSDUs' bitmap fields is that the BA MSDUs' bitmap field in FIG. 7 has a size of 64 bits (8 octets) so as to represent reception success or failure for 64 packets.

The BA erroneous MSDUs' bitmap field consists of ACK MAP fields corresponding to the number of unsuccessfully received packets. The BA erroneous MSDUs' bitmap field has the same structure and function as those of the erroneous SN packet bitmap field described above with reference to FIG. 5, thus, a detailed description of the BA erroneous MSDUs' bitmap field will also be omitted.

Hereinafter, a second preferred embodiment of the present invention will be describe in detail with reference to the accompanying drawings.

The second embodiment of the present invention premises a system for transmitting a block ACK request frame together with consecutive data frames from a transmitting party to a receiving party. The block ACK request frame includes information needed for transmitting the reception results of the respective data frames. The block ACK request frame may be transmitted before or after the transmission of the data frames. Of course, it is possible to simultaneously transmit the block ACK request frame and the data frames.

The receiving party receives the data frames and the block ACK request frame. The receiving party determines a bitmap configuration scheme on the basis of the information received through the block ACK request frame, and then configures the bitmaps according to the determined bitmap configuration scheme such that the bitmaps include reception results for the data frames. The bitmaps are acknowledged to the transmitting party through a bloc ACK frame.

In the second embodiment of the present invention, information about 'the number of SN level packets to be consecutively transmitted (m)' and 'the maximum number of fragmentation packets (n)' are transmitted through the block ACK request frame. Usually, the SN level packet is transmitted having been divided into a plurality of fragmentation packets, if necessary. The maximum number of fragmentation packets (n) is the maximum number of fragmentation packets that can be made from the SN level packets to be transmitted.

In the following description, an operation for transmitting the block ACK request frame at the transmitting party and a structure of the block ACK request frame will be discussed in detail. Also, an operation for reporting reception results on a fragmentation packet-by-fragmentation packet basis through the block ACK frame at the receiving party and a structure of the block ACK frame will be discussed in detail.

Furthermore, in an example of the present invention, there will be discussed an operation performed when the number of packets to be consecutively transmitted (m) and the maximum number of fragmentation packets are randomly given.

Hereinafter, the operations of the transmitting and receiving parties in accordance with preferred embodiments of the present invention will be described in detail.

Figure 8:
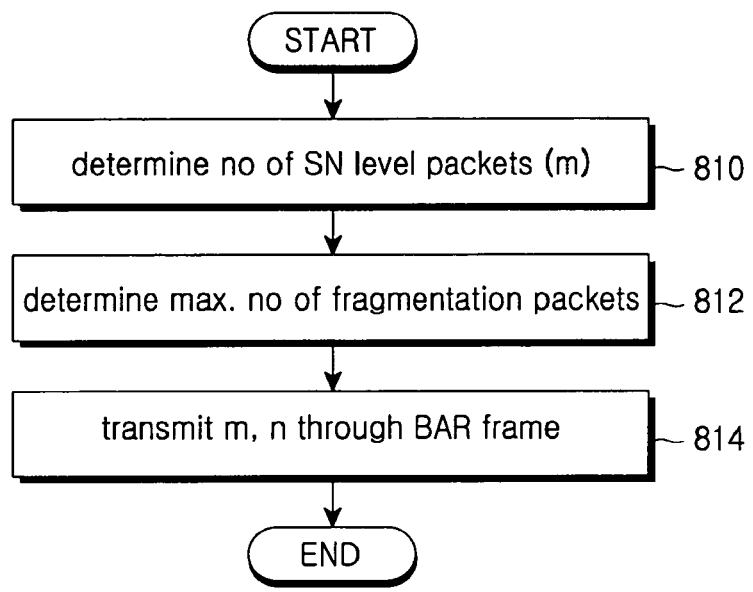
FIG. 8 is a control flowchart for explaining operations at a transmitting party in accordance with a preferred embodiment of the of the present invention.

FIG. 8 shows a control flow for explaining the operation of the transmitting party in accordance with a preferred embodiment of the present invention.

Referring to FIG. 8, in step 810, the number of packets to be transmitted (m) is determined. The determination of 'm' is effected by the number of SN level packets to be consecutively transmitted. Each SN level packet may be transmitted dividedly into plural fragmentation packets. In step 812, the maximum number of fragmentation packets is determined, or in other words the division status of each SN level packet is confirmed. That is, the numbers of fragmentation packets divided from the respective SN level packets are detected and the SN level packet, from which the most fragmentation packets are divided, is determined. The number of fragmentation packets divided from the found SN level packet is determined as the maximum number of fragmentation packets (n).

In step 814, the Block ACK Request (BAR) frame is configured such that 'm' and 'n' as determined above are included in the BAR frame. At this time, the SN of the first SN level packet to be transmitted is recorded in the block ACK starting sequence control field of the BAR frame. The transmitting party transmits the BAR frame to the receiving party. A structure of the BAR frame will be discussed with respect to FIG. 10.

Although not shown in FIG. 8, m SN level packets may be transmitted before or after the transmission of the corresponding BAR frame. Of course, it is possible to simultaneously transmit the SN level packets with the BAR frame. Also, the receiving party provides to the transmitting party the reception results corresponding to the respective fragmentation packets of m SN level packets. The reception results, on a fragmentation packet-by fragmentation packet basis, are provided through the Block ACK (BA) frame. The transmitting party retransmits the fragmentation packets based on the reception results for the respective fragmentation packets acquired through the BA frame.

Figure 9:
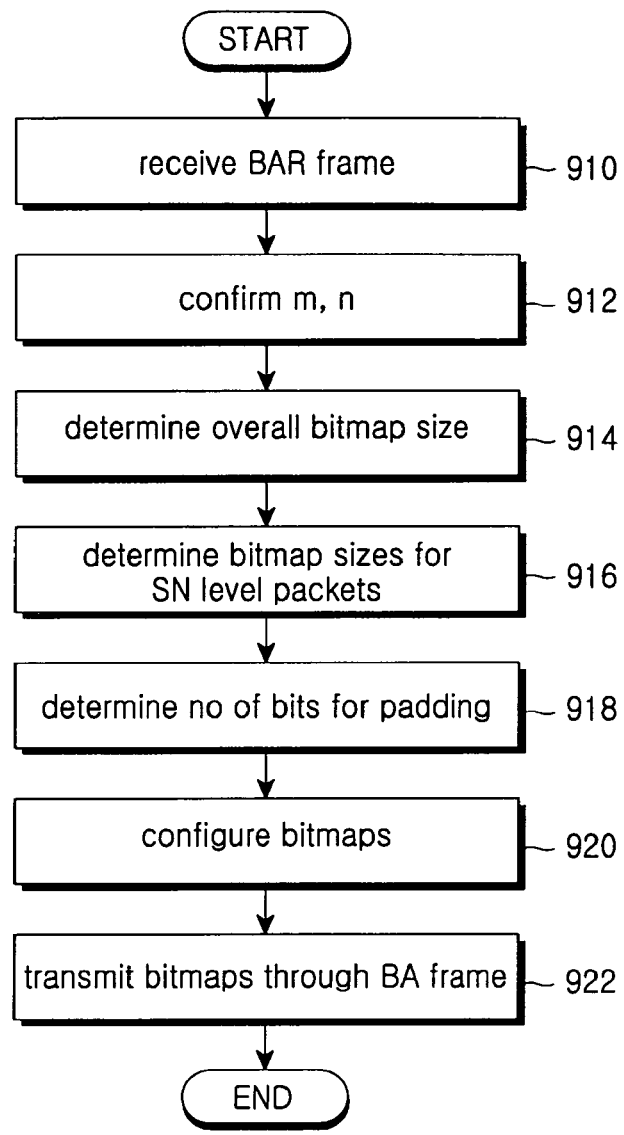
FIG. 9 is a control flowchart for explaining operations at a receiving party in accordance with a preferred embodiment of the of the present invention.

FIG. 9 shows a control flow for explaining the operation of the receiving party in accordance with a preferred embodiment of the present invention.

Referring to FIG. 9, in step 910, the receiving party receives the BAR frame. In step 912, the receiving party confirms 'm' and 'n' from the BAR frame.

Once the receiving party confirms 'm' and 'n', it determines a bitmap configuration scheme through steps 914 to 918. The bitmap configuration scheme is determined by the overall bitmap size, the bitmap size corresponding to one SN level packet and the number of bits to be padding-processed.

In step 914, the overall bitmap size is determined. The overall bitmap size is determined by 'm' and 'n' previously confirmed in step 912. As an example, the overall bitmap size can be determined by Equation (1) as follows:

$$\text{Overall bitmap size} = \text{ceiling}[m \times n/8] \text{ octets} \quad (1)$$

where ceiling [x] denotes a minimum integer from among integers exceeding 'x'. The overall bitmap size may also be expressed as the overall bitmap size in bit by multiplying the overall bitmap size in octet by '8'.

For example, if 'm' is 2 and 'n' is 7, the overall bitmap size is expressed by 'ceiling [1.75]'. Since 'ceiling [1.75]' denotes a minimum integer from among integers larger than '1.75', it results in '2'. Thus, the overall bitmap size is determined as 2 octets.

In step 916, the bitmap sizes to be assigned to the respective SN level packets are determined. Preferably, the same bitmap size is assigned to all the SN level packets. When the same bitmap size is assigned in this way, the bitmap size for only one SN level packet is determined and the determined bitmap size can be applied to the remaining SN level packets. For example, the bitmap size is determined as 'n' previously confirmed in step 912. This is because reception results must be acknowledged on a fragmentation packet-by-fragmentation packet basis.

According to the above-mentioned description, the sum of the bitmap sizes to be assigned to the respective SN level packets dos not exceed the overall bitmap size. That is, when the bitmap sizes are assigned to the respective SN level packets, the sum of the bitmap sizes is equal to the overall bitmap size or the remaining bits occur. In step 918, the number of bits to be padding-processed is determined. However, when the sum of the bitmap sizes assigned to the respective SN level packets is equal to the overall bitmap size, there is no remaining bit, and no padding is required. The number of bits to be padded can be generalized by Equation (2) as follows:

$$\text{ceiling } [m \times n/8] \times 8 \times m \times n \quad (2)$$

The unit of Equation (2) is a bit. The bitmap configuration scheme is determined by the overall bitmap size, the bitmap sizes according to the respective SN level packets and the number of bits to be padding-processed previously determined through steps 914 to 918. Also, bit values according to the reception results on a fragmentation packet-by-fragmentation packet basis are inserted in corresponding bit positions. As for the bit positions, refer to SNs and FNs which the fragmentation packets have '1 (success)' and '0 (failure)' are used as the bit values according to the reception results.

The bitmap structure will be described with reference to FIG. 11. Examples of inserting the bit values according to the reception results for the respective fragmentation packets in the corresponding bit positions are illustrated in FIGS. 12 to 14. These examples will also be described later in detail.

In step 922, the BA frame including the bitmaps is configured and transmitted to the transmitting party.

Hereinafter, a structure of the BAR frame transmitted from the transmitting party in accordance with the second embodiment of the present invention will be described in detail.

The structure of the BAR frame proposed in the second embodiment of the present invention is characterized in that it includes information about the number of SN level packets to be consecutively transmitted (m) and the number of fragmentation packets of the SN level packet divided the most (n).

Figure 10:
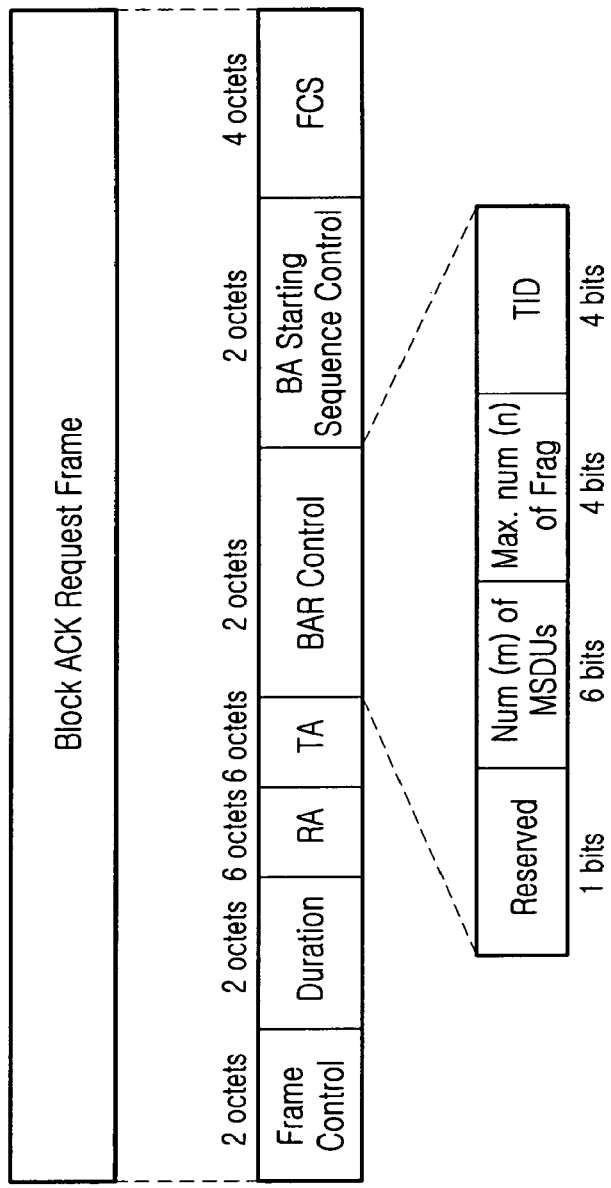
FIG. 10 is a diagram showing a structure of a block ACK request frame in accordance with a preferred embodiment of the present invention.

FIG. 10 illustrates a structure of the BAR frame, on which the above-mentioned characteristic is reflected.

Referring to FIG. 10, the BAR frame includes a BAR control field and a BA starting sequence control field. The sizes of the BAR control field and the BA starting sequence control field are 2 octets each.

The BAR control field includes a 'Num of MSDUs' field and a 'Max. num of Frag' field. The number of SN level packets to be consecutively transmitted (m) is recorded in the 'Num of MSDUs' field. The number of fragmentation packets of the SN level packet divided the most (n) is recorded in the 'Max. num of Frag' field. The size of the 'Num of MSDUs' field is 6 bits, and the size of the 'Max. num of Frag.' Field is 4 bits.

The SN of the first SN level packet to be transmitted from among the consecutively transmitted SN level packets is recorded in the BA starting sequence control field.

Hereinafter, a structure of the BA frame transmitted to the receiving party in accordance with the second embodiment of the present invention will be described in detail.

The structure of the BA frame proposed in the second embodiment of the present invention is characterized in that it has a bitmap structure which is optimized using 'm' and 'n' provided from the transmitting party.

Figure 11:
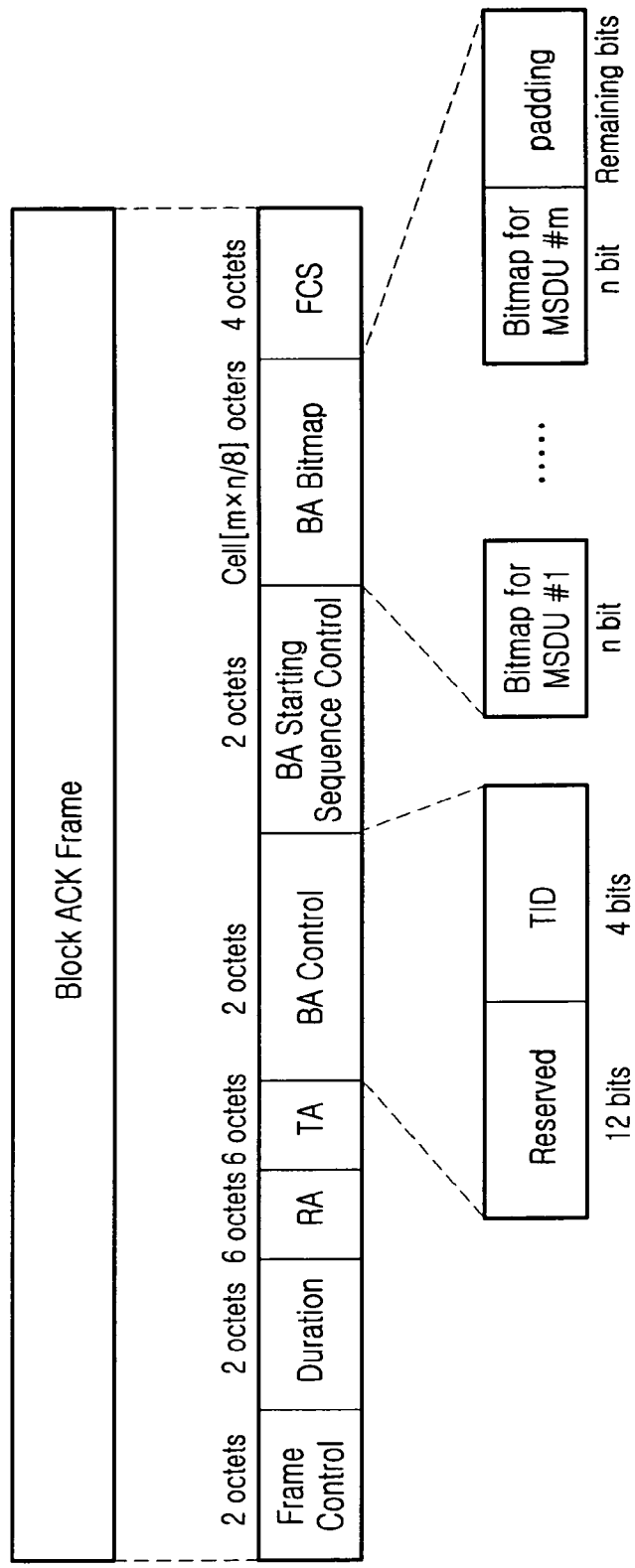
FIG. 11 is a diagram showing a structure of a block ACK frame in accordance with a preferred embodiment of the present invention.

FIG. 11 illustrates a structure of the BA frame, on which the above-mentioned characteristic is reflected.

Referring to FIG. 11, the BA frame includes a BA starting sequence control field and a BA bitmap field.

The most preceding SN level packet from among the consecutively received SN level packets is recorded in the BA starting sequence control field.

The overall size of the BA bitmap field is determined by Equation (1). That is, the overall size of the BA bitmap field can be determined by 'm' and 'n' received through the BAR frame. The BA bitmap field consists of m bitmaps. Each of m bitmaps is configured with a size of n bits. Each bit constituting the bitmaps represents a reception result of a corresponding fragmentation packet. Each of the bitmaps corresponds to one of the consecutively received SN level packets, and a reception result for the corresponding SN level packet is recorded in the bitmap. At this time, a bit position, in which the reception result for the fragmentation packet is recorded within the bitmap, is assigned by the SN and the FN of the fragmentation packet. The remaining bits, which are not used as the bitmaps in the BA bitmap field, are subjected to the padding processing. The number of bits to be padded can be derived by Equation (2).

Hereinafter, case-by-case operations in accordance with the second embodiment of the present invention will be described.

Figure 12A:
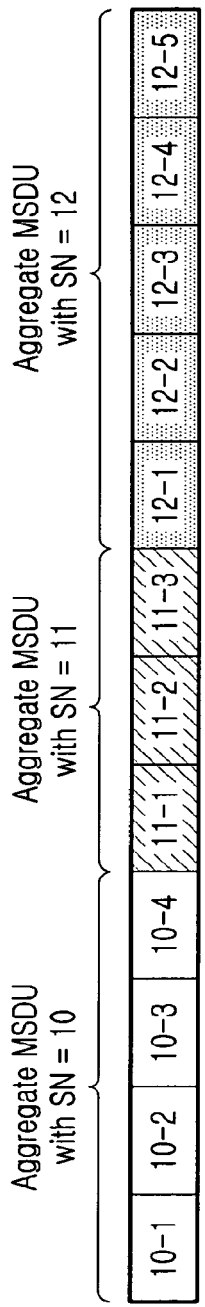
FIGS. 12A to 12C, 13A to 13C, and 14A to 14C are diagrams showing operational examples in accordance with preferred embodiments of the present invention.
Figure 12B:
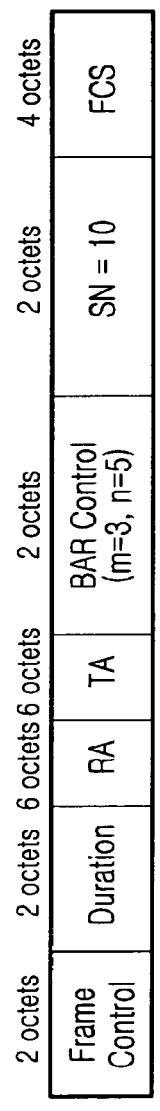
Figure 12C:
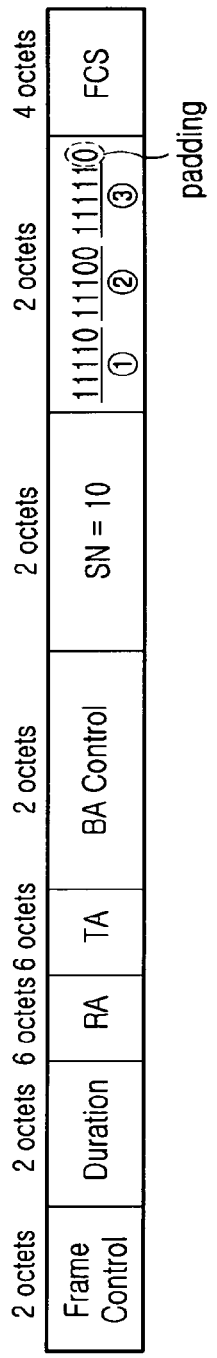

FIGS. 12A to 12C are views for explaining an operational example in a case where all SN level packets consecutively transmitted from the transmitting party are successfully received.

FIG. 12A shows that three SN level packets (SN=10, 11, 12) are consecutively transmitted. Here, the SN level packet having SN=10 are divided into four fragmentation packets 10-1, 10-2, 10-3, 10-4, the SN level packet having SN=11 are divided into three fragmentation packets 11-1, 11-2, 11-3, and the SN level packet having SN=12 are divided into five fragmentation packets 12-1, 12-2, 12-3, 12-4, 12-5. Thus, 'm' is determined as '3', and 'n' is determined as '5'. The reason why 'n' is determined as '5' is that the number of fragmentation packets divided the most from one SN level packet is '5'.

FIG. 12B shows a BAR frame structure in which m='3' and n='5' are set in the BAR control field. The SN of a SN level packet which is transmitted first from among the three consecutively transmitted SN level packets is '10'. Thus, '10' is recorded in the BA starting sequence control field.

If the receiving party receives the BAR frame having the structure as shown in FIG. 12B, it confirms information recorded in the BAR control field and the BA starting sequence control field. Hereby, the receiving party recognizes that the three SN level packets having SNs of 10, 11 and 12 are consecutively transmitted and the number of fragmentation packets divided the most is '5'.

Subsequently, the receiving party determines the overall bitmap size by Equation (1). According to Equation (1), the overall bitmap size is determined as 2 octets (16 bits). Indicator bits indicating reception results corresponding to the respective SN level packets are determined as a 5-bit indicator bit. This is because the SN level packet having SN=12 is divided into five fragmentation packets and at least 5 bits are required for indicating reception results on a fragmentation packet-by-fragmentation packet basis.

The four fragmentation packets constituting the SN level packet having SN=10 have been all successfully received. Thus, the indicator bit indicating the reception result for the SN level packet having SN=10 is set as '11110' (designated by ① in FIG. 12C). The upper four bits set as '1' indicate that the respective fragmentation packets have been successfully received. The last bit is set as '0' because there is no fragmentation packet corresponding to that bit.

The three fragmentation packets constituting the SN level packet having SN=11 have been all successfully received. Thus, the indicator bit indicating the reception result for the SN level packet having SN=11 is set as '11100' (designated by ② in FIG. 12C). The upper three bits set as '1' indicate that the respective fragmentation packets have been successfully received. The lower 2 bits are set as '0' because there is no fragmentation packet corresponding to those bits.

The five fragmentation packets constituting the SN level packet having SN=12 have been all successfully received. Thus, the indicator bit indicating the reception result for the SN level packet having SN=12 is set as '11111' (designated by ③ in FIG. 12C). The five bits set as '1' indicate that the respective fragmentation packets have been successfully received.

Once the 5-bit indicator bits indicating the reception results for the respective SN level packets are assigned, the remaining bit of 1 bit occurs in the bitmap the overall size of which has been determined as 2 octets (16 bits). This is determined by Equation (2). The receiving party performs padding for the remaining bit. That is, the remaining bit is set as '0'.

In conclusion, the reception result for the three consecutively transmitted SN level packets is determined as '11110 11100 11111 0'. The determined reception result is recorded in the BA bitmap field of the BA frame. Also, '10' is recorded in the BA starting sequence control field of the BA frame.

FIGS. 13A to 13C and FIGS. 14A to 14C are views for explaining operational examples in a case where some SN level packets are unsuccessfully received from among SN level packets consecutively transmitted from the transmitting party.

Figure 13A:
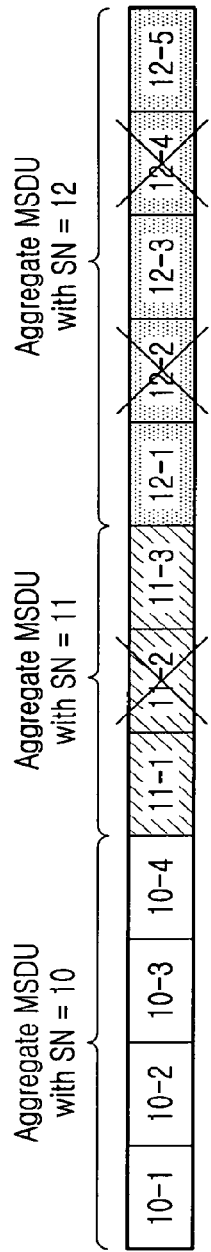

FIG. 13A shows that three SN level packets (SN=10, 11, 12) are consecutively transmitted. Here, the SN level packet having SN=10 are divided into four fragmentation packets 10-1, 10-2, 10-3, 10-4, the SN level packet having SN=11 are divided into three fragmentation packets 11-1, 11-2, 11-3, and the SN level packet having SN=12 are divided into five fragmentation packets 12-1, 12-2, 12-3, 12-4, 12-5. Thus, 'm' is determined as '3', and 'n' is determined as '5'. The reason why 'n' is determined as '5' is that the number of fragmentation packets divided the most from one SN level packet is '5'. Among the fragmentation packets, the fragmentation packets corresponding to 11-2, 12-2 and 12-4 have been unsuccessfully received.

Figure 13B:
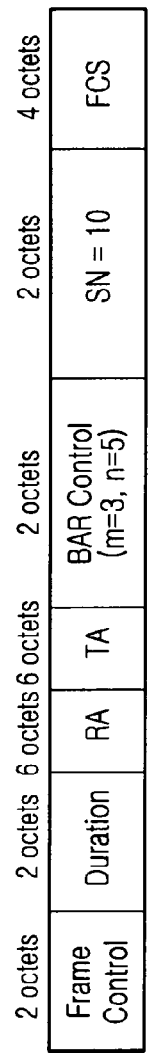
Figure 13C:
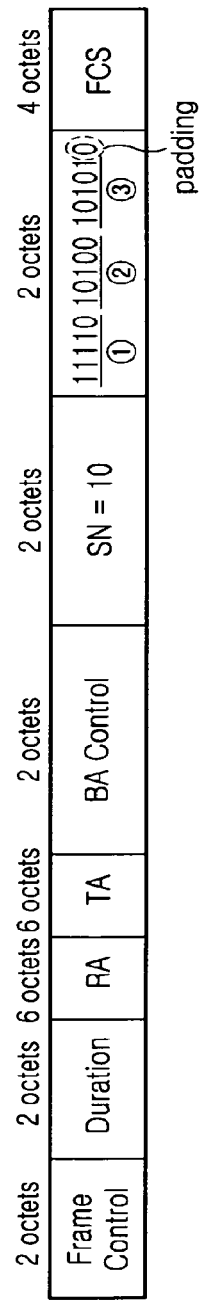

FIG. 13B shows a BAR frame structure in which m='3' and n='5' are set in the BAR control field. The SN of a SN level packet to be transmitted first is '10'. Thus, '10' is recorded in the BA starting sequence control field.

If the receiving party receives the BAR frame having the structure as shown in FIG. 13B, it confirms information recorded in the BAR control field and the BA starting sequence control field. Hereby, the receiving party recognizes that the three SN level packets having SNs of 10, 11 and 12 are consecutively transmitted and the number of fragmentation packets divided the most is '5'.

Subsequently, the receiving party determines the overall bitmap size by Equation (1). According to Equation (1), the overall bitmap size is determined as 2 octets (16 bits). Indicator bits indicating reception results corresponding to the respective SN level packets are determined as a 5-bit indicator bit. This is because the SN level packet having SN=12 is divided into five fragmentation packets and at least 5 bits are required for indicating reception results on a fragmentation packet-by-fragmentation packet basis.

The four fragmentation packets 10-1, 10-2, 10-3, 10-4 constituting the SN level packet having SN=10 have been all successfully received. Thus, the indicator bit indicating the reception result for the SN level packet having SN=10 is set as '11110' (designated by ① in FIG. 13C). The upper four bits set as '1' indicate that the respective fragmentation packets have been successfully received. The last bit is set as '0' because there is no fragmentation packet corresponding to that bit.

Of the three fragmentation packets 11-1, 11-2, 11-3 constituting the SN level packet having SN=11, the fragmentation packets corresponding to 11-1 and 11-3 have been successfully received, but the fragmentation packet corresponding to 11-2 has been unsuccessfully received. Thus, the indicator bit indicating the reception result for the SN level packet having SN=11 is set as '10100' (designated by ② in FIG. 13C). The bits set as '1' indicate that the corresponding fragmentation packets 11-1, 11-3 have been successfully received. In contrast with this, the bit set as '0' indicates that the corresponding fragmentation packet 11-2 has been unsuccessfully received. The lower 2 bits are set as '0' because there is no fragmentation packet corresponding to those bits.

Of the five fragmentation packets 12-1, 12-2, 12-3, 12-4, 12-5 constituting the SN level packet having SN=12, the fragmentation packets corresponding to 12-1, 12-3 and 12-5 have been successfully received, but the fragmentation packets corresponding to 12-2 and 12-4 have been unsuccessfully received. Thus, the indicator bit indicating the reception result for the SN level packet having SN=12 is set as '10101' (designated by ③ in FIG. 13C). The bits set as '1' indicate that the corresponding fragmentation packets 12-1, 12-3, 12-5 have been successfully received. In contrast with this, the bits set as '0' indicate that the corresponding fragmentation packets 12-2, 12-4 have been unsuccessfully received.

Once the 5-bit indicator bits indicating the reception results for the respective SN level packets are assigned, the remaining bit of 1 bit occurs in the bitmap the overall size of which has been determined as 2 octets (16 bits). This is determined by Equation (2). The receiving party performs padding for the remaining bit. That is, the remaining bit is set as '0'.

In conclusion, the reception result for the three consecutively transmitted SN level packets is determined as '11110 10100 10101 0'. The determined reception result is recorded in the BA bitmap field of the BA frame. Also, '10' is recorded in the BA starting sequence control field of the BA frame.

Figure 14A:
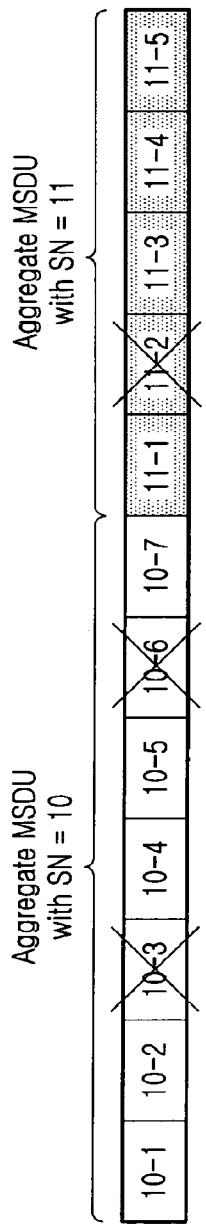

FIG. 14A shows that two SN level packets (SN=10, 11) are consecutively transmitted. Here, the SN level packet having SN=10 are divided into seven fragmentation packets 10-1, 10-2, 10-3, 10-4, 10-5, 10-6, 10-7, and the SN level packet having SN=11 are divided into five fragmentation packets 11-1, 11-2, 11-3, 11-4, 11-5. Thus, 'm' is determined as '2', and 'n' is determined as '7'. The reason why 'n' is determined as '7' is that the number of fragmentation packets divided the most from one SN level packet is '7'. Among the fragmentation packets, the fragmentation packets corresponding to 10-3, 10-6 and 11-2 have been unsuccessfully received.

Figure 14B:
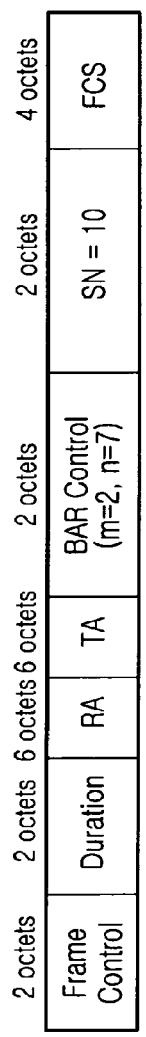
Figure 14C:
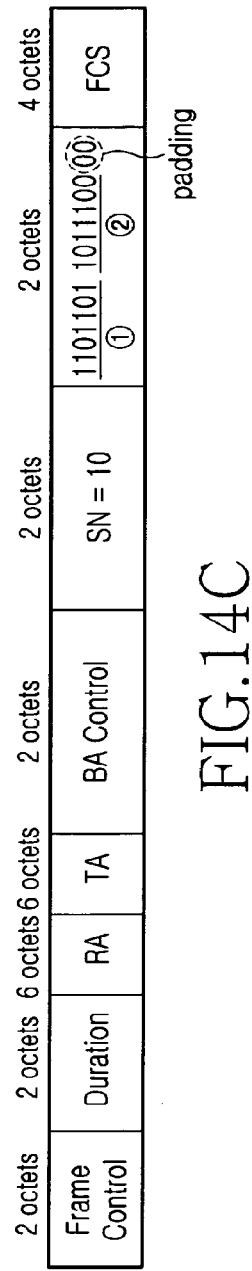

FIG. 14B shows a BAR frame structure in which m='2' and n='7' are set in the BAR control field. The SN of a SN level packet to be transmitted first is '10'. Thus, '10' is recorded in the BA starting sequence control field.

If the receiving party receives the BAR frame having the structure as shown in FIG. 14B, it confirms information recorded in the BAR control field and the BA starting sequence control field. Hereby, the receiving party recognizes that the two SN level packets having SNs of 10 and 11 are consecutively transmitted and the number of fragmentation packets divided the most is '7'.

Subsequently, the receiving party determines the overall bitmap size by Equation (1). According to Equation (1), the overall bitmap size is determined as 2 octets (16 bits). Indicator bits indicating reception results corresponding to the respective SN level packets are determined as a 7-bit indicator bit. This is because the SN level packet having SN=10 is divided into seven fragmentation packets and at least 7 bits are required for indicating reception results on a fragmentation packet-by-fragmentation packet basis.

Of the seven fragmentation packets 10-1, 10-2, 10-3, 10-4, 10-5, 10-6, 10-7 constituting the SN level packet having SN=10, the fragmentation packets corresponding to 10-1, 10-2, 10-4, 10-5 and 10-7 have been successfully received, but the fragmentation packet corresponding to 10-3 and 10-6 have been unsuccessfully received. Thus, the indicator bit indicating the reception result for the SN level packet having SN=10 is set as '1101101' (designated by ① in FIG. 14C). The bits set as '1' indicate that the corresponding fragmentation packets 10-1, 10-2, 10-4, 10-5, 10-7 have been successfully received. In contrast with this, the bits set as '0' indicate that the corresponding fragmentation packet 10-3, 10-6 have been unsuccessfully received.

Of the five fragmentation packets 11-1, 11-2, 11-3, 11-4, 11-5 constituting the SN level packet having SN=11, the fragmentation packets corresponding to 11-1, 11-3, 11-4 and 11-5 have been successfully received, but the fragmentation packet corresponding to 11-2 has been unsuccessfully received. Thus, the indicator bit indicating the reception result for the SN level packet having SN=11 is set as '1011100' (designated by ② in FIG. 14C). The bits set as '1' indicate that the corresponding fragmentation packets 11-1, 11-3, 11-4, 11-5 have been successfully received. In contrast with this, the bit set as '0' indicates that the corresponding fragmentation packet 11-2 has been unsuccessfully received. The lower 2 bits are set as '0' because there is no fragmentation packet corresponding to those bits.

Once the 7-bit indicator bits indicating the reception results for the respective SN level packets are assigned, the remaining bits of 2 bits occur in the bitmap the overall size of which has been determined as 2 octets (16 bits). This is determined by Equation (2). The receiving party performs padding for the remaining bits. That is, the remaining bits are set as '0'.

In conclusion, the reception result for the three consecutively transmitted SN level packets is determined as '1101101 1011100 00'. The determined reception result is recorded in the BA bitmap field of the BA frame. Also, '10' is recorded in the BA starting sequence control field of the BA frame.

In the above-mentioned second embodiment of the present invention, it is assumed that the transmitting party provides the number of SN level packets to be consecutively transmitted and the maximum number of fragmentation packets to the receiving party in order to negotiate the bitmap size in advance. However, the present invention can be realized in such a manner that the receiving party confirms the number of consecutively transmitted SN level packets and the maximum number of fragmentation packets by receiving the consecutively transmitted SN level packets. In this way, there is no need for transmitting the block ACK request (BAR) frame at the transmitting party.

As described above, the present invention makes it possible to efficiently use transmission resources by providing a hierarchical bitmap structure. Also, in view of an actual communication environment, it may be expected to not only enhance gains in the transmission resources, but also have a great effect on performance of a mobile communication system. Furthermore, by negotiating the bitmap size in advance through the block ACK request, the number of bits for reporting reception results can be optimized. This results in effective using of the transmission resources and performance improvement of a mobile communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A receiver for configuring a Block Acknowledgement (BA) frame in a wireless communication system for acknowledgement of a data transmission from a transmitter, the receiver configured to:
   receive a Block Acknowledgement Request (BAR) frame in the data transmission from the transmitter;
   determine an overall size of a bitmap for the BA frame from the BAR frame to acknowledge the data transmission;
   configure the BA frame of the response to include the bitmap having the determined overall size; and
   transmit the configured BA frame to the transmitter,
   wherein the bitmap of the BA frame includes bits representing reception results of packets of the data transmission received from the transmitter.

2. The receiver of claim 1, wherein the overall bitmap size is determined by the receiver to be:

Overall bitmap size=ceiling[$m \times n/8$]octets where ceiling denotes a minimum integer from among integers exceeding 'x', the variable 'm' is a number of consecutively received packets, and the variable 'n' is a number of fragmentation packets,
   wherein the variable 'm' and the variable 'n' are determined from the BAR frame.

3. The receiver of claim 2, wherein the bitmap of the BA includes a plurality of individual bitmaps for the consecutively received packets and a size of each individual bitmap corresponding to each of the consecutively received packets is determined as n bits.

4. The receiver of claim 3, wherein a number of bits out of the overall bitmap size are padding bits, the number of padding bits being calculated by the following equation:

ceiling[$m \times n/8$]$\times 8 - m \times n$.

5. The receiver of claim 1, wherein each bit of the bitmap for the block acknowledgement is set as '1' when a corresponding packet is successfully received, and is set as '0' when reception of the corresponding packet has failed.

6. The receiver of claim 1, wherein information about bitmap size is included in a control field of the BAR frame.

7. The receiver of claim 1, wherein the BAR frame includes bitmap size related information used by the receiver in determining the overall size of the bitmap.

8. The receiver of claim 1, wherein:
   the receiver is further configured to determine the overall size of the bitmap based on the BAR frame.

9. The receiver of claim 1, wherein:
   the BAR frame comprises information associated with the overall size of the bitmap; and
   the receiver is further configured to determine the overall size of the bitmap based on the information associated with the overall size of the bitmap.

10. The receiver of claim 1, wherein:
    the BAR frame comprises a number of packets to be transmitted, and a maximum number of fragmentation packets divided from the respective packets; and
    the receiver is further configured to determine the overall size of the bitmap based on the number of packets, and the maximum number of fragmentation packets.

* * * * *